United States Patent [19]

Cheung et al.

[11] Patent Number: 4,685,082
[45] Date of Patent: Aug. 4, 1987

[54] SIMPLIFIED CACHE WITH AUTOMATIC UPDATE

[75] Inventors: Kin L. Cheung, N. Andover; Jeffrey W. Einarson, N. Chelmsford, both of Mass.

[73] Assignee: Wang Laboratories, Inc., Lowell, Mass.

[21] Appl. No.: 704,359

[22] Filed: Feb. 22, 1985

[51] Int. Cl.⁴ ............................................. G11C 13/00
[52] U.S. Cl. .................................... 365/49; 364/200; 365/189
[58] Field of Search ................ 365/49, 189, 200, 230; 364/200

[56] References Cited

U.S. PATENT DOCUMENTS 4,445,177 4/1984 Bratt .................................. 364/200

Primary Examiner—Terrell W. Fears
Attorney, Agent, or Firm—Michael H. Shanahan; Gordon E. Nelson

[57] ABSTRACT

A simplified cache with automatic updating for use in a memory system. The cache and the main memory receive data from a common input, and when a memory write operation is performed on data stored at a memory location for which there is a corresponding cache location, the data is written simultaneously to the cache and to the main memory. Since a cache location coresponding to a memory location always contains a copy of the data at the memory location, there is no need for dirty bits or valid bits in the cache resisters and the associated logic in the cache control. The main memory used with the invention may receive data either from a CPU or from I/O devices, and the cache includes apparatus permitting the CPU to perform cache read operations while the main memory is receiving data from an I/O device.

23 Claims, 4 Drawing Figures

CACHE OF THE PRESENT INVENTION IN A DIGITAL COMPUTER SYSTEM

PRIOR-ART CACHE IN A DIGITAL COMPUTER SYSTEM

CACHE OF THE PRESENT INVENTION IN A DIGITAL COMPUTER SYSTEM

DETAILED BLOCK DIAGRAM OF A PREFERRED EMBODIMENT

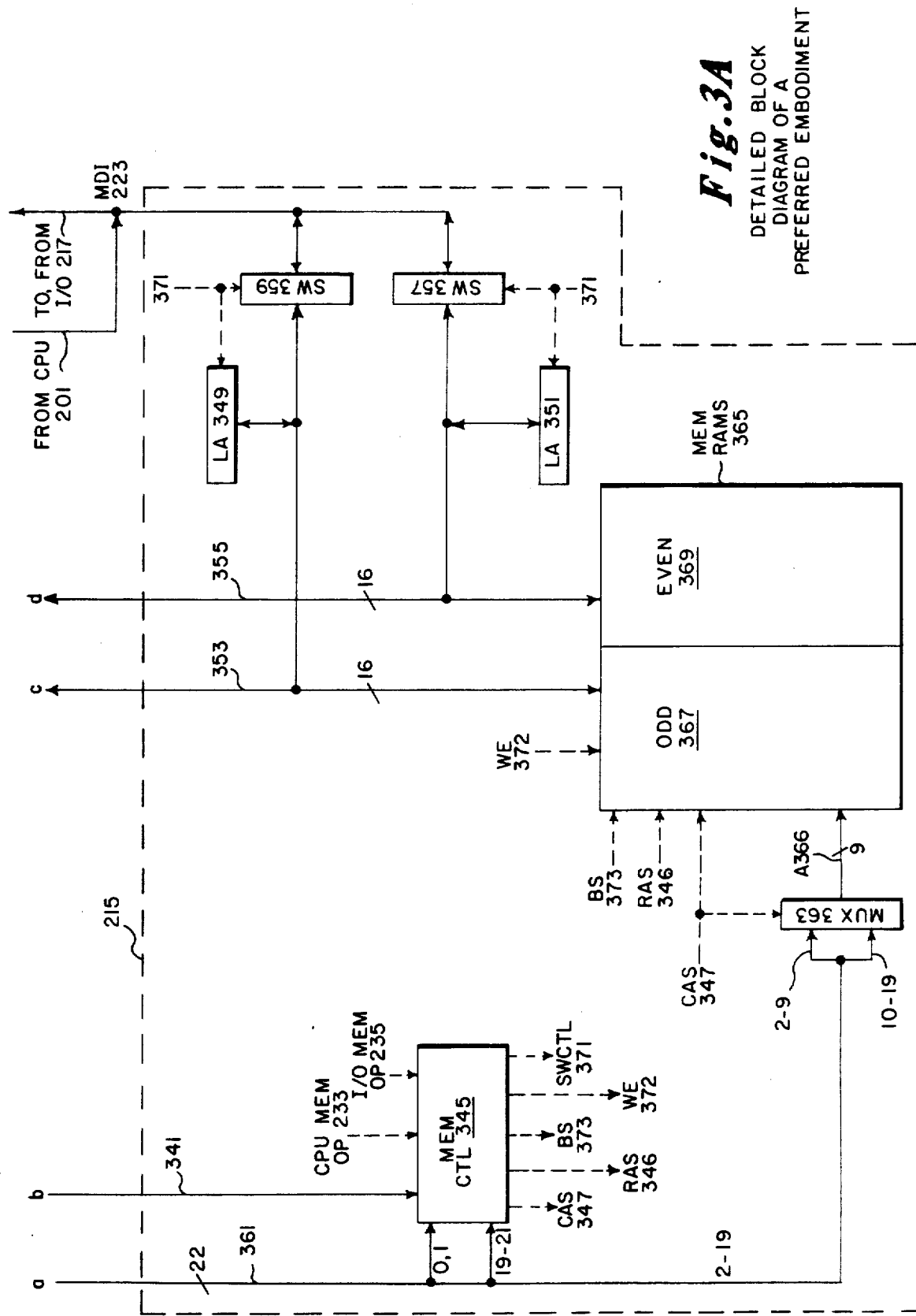
Fig.3A DETAILED BLOCK DIAGRAM OF A PREFERRED EMBODIMENT

SIMPLIFIED CACHE WITH AUTOMATIC UPDATE

BACKGROUND OF THE INVENTION

1. Field of the Invention

The present invention relates to memory systems used in digital computer systems and more particularly to memory systems which include high-speed data caches.

2. Description of the Prior Art: FIG. 1

As CPUs have gotten faster and faster, computer system performance has often been limited by the amount of time required to perform the memory operations of fetching data from and writing data to memory. In order to speed up memory operations, the prior art has employed hierarchical memories. At the top of the hierarchy is a small amount of fast, expensive memory; at the bottom is a large amount of slow, cheap memory. For example, a virtual memory computer system may have three levels of memory: a high-speed cache which contains copies of data currently being referenced by the CPU, a main memory which contains copies of the data in the cache and additionally contains copies of data at memory locations near those containing the data currently being referenced, and one or more disk drives containing all of the data presently available to the CPU. As a program references data, the computer system typically copies pages containing the referenced data from the disk drive to the main memory and individual data items from the main memory to the cache. Once most of the data required to execute a program is in the cache, it is the time required to fetch data from the cache, rather than the time required to fetch data from the disk or main memory, which determines the speed with which the CPU can process data. Of course, if a memory operation alters data in the cache, then the computer system must ensure that the data from which the cache contents was copied in main memory and on disk is correspondingly altered. Similarly, if a memory operation performed by some other portion of the system, for example, an I/O device, alters the contents of a part of memory which has been encached, then the copies in the cache must also be altered.

As may be seen from the above overview of hierarchical memory systems, the primary problem in cache design is maintaining consistency between the contents of the cache and the data at other levels of the hierarchy. FIG. 1 shows the manner in which the prior art has solved the problem of consistency. FIG. 1 is a block diagram of a digital computer system including a cache of the type described in U.S. Pat. No. 4,445,177, Bratt, et al., *Digital Data Processing System* . . ., issued Apr. 24, 1984. The digital data processing system of FIG. 1 includes CPU 101, cache 103, and main memory 117. As may be seen from the connections between CPU 101, cache 103, and memory 117 in FIG. 1, all transfer of data between CPU 101 and memory 117 takes place via cache 103. If CPU 101 reads data and a copy of data is not present in cache 103, cache 103 first obtains the data from memory 117 and then provides it to CPU 101. Similarly, if CPU 101 writes data, it writes the data to cache 103, which then updates the data in memory 117.

Turning now to cache 103, cache 103 is made up of two main components: store 107 and control 105. Store 107 contains the copies stored in the cache and information required for cache operation. The contents of store 103 are arranged as a series of registers 108. At a given moment, each register 108 corresponds to one address in memory 117 and may contain a copy of the data at that address in memory 117. At different times, a register 108 may correspond to different addresses in memory 117. Each register 108 contains a validity bit v 109, indicating whether the copy of data it contains is valid, a tag 111, which serves to relate the register 108 to the memory address to which it currently corresponds, data 113, which, when valid, contains a copy of the data at the corresponding address in memory 117, and a dirty bit d 115, which indicates whether data 113 has been altered since it was written back to memory 117.

Control 105 controls operation of the cache in responseto the contents of v 109, tag 111, and d 115, addresses and control signals from the CPU and I/O devices and further produces control signals of its own which synchronize the operation of CPU 101, cache 103, and memory 117. When CPU 101 performs a memory operation, the address of the data being operated on and a control signal indicating the kind of operation go to control 105. Control 105 uses a portion of the address to select a register 108; if tag 111 in that register 108 has the same value as the remainder of the address, the register 108 corresponds to the location in memory 117 specified by the address.

What happens next depends on the kind of operation indicated by the control signal. If the operation is a read operation and v 109 in register 108 indicates that the register contains a valid copy of the data at the location in memory 117 indicated by the address, the contents of data 113 is output to CPU 101; if the operation is a write operation, the data is written from CPU 101 to data 113 and dirty bit 115 is set to indicate that data 113 has changed. In this situation, control 105 must write the value of data 113 back to the location in memory 117 specified by the address and reset dirty bit 115.

If tag 111 in register 108 addressed by the address from the CPU does not have the same value as the remainder of the bits in the address, or if v bit 109 indicates that data 113 in register 108 is invalid, the cache does not contain a copy of the data at the location specified by the address and a cache miss results. If the miss is on a write operation, cache 103 constructs an entry for the address by placing the data being written in data 113 of register 108 specified by the address, placing the remainder of the address in tag 111 of that register 108, setting v 109 to indicate validity, and d 115 to indicate that the value of data 113 has changed. Control 105 then writes the contents of data 113 to memory 117 as described above.

If the miss is on a read operation, control 105 responds to the miss by generating a control signal to CPU 101 which causes CPU 101 to wait until there is a valid cache entry. Then it provides the address and a control signal indicating a read operation to memory 117, which responds with the data at the location specified by the address. Control 105 then locates the proper register 108 for the data, loads the data into data 113, the remainder of the address into tag 111, sets v 109 to indicate a valid entry and resets d bit 115. Thereupon, CPU 101 reattempts the memory reference. Since the data is now contained in the cache, it succeeds and the data is output as described above.

Another consistency problem arises when the computer system which includes cache 103 allows I/O devices to bypass CPU 101 and write data directly to memory 117. In this case, when an I/O write operation alters data in memory 117 of which there is a copy encached in cache 103, some change must be made in cache 103. In cache 103 of FIG. 1, control 105 receives the address each time there is an I/O write operation, and if there is a hit as described above, control 105 sets v 109 in the register 108 specified by the address to indicate that the contents of data 113 are invalid. As described above, on the next reference to the memory location which received the data from I/O, a miss will result and the proper value of the data will be written to cache 103.

In the prior art, data caches have been characteristic of relatively large and expensive digital computer systems. One reason for this has been the high cost of high-speed memory; another has been the high cost of the complex control logic required for such a cache. Technical progress has reduced the cost of high-speed memory, but there has been no corresponding reduction in the cost of the components of the control logic. Simplification of control logic has thus become a major problem in cache design. One solution to this problem is provided by the present invention.

SUMMARY OF THE INVENTION

The present invention relates to memory systems and in particular to memory systems employing a data cache. In the memory system of the present invention, a memory and a cache are both connected to a data transfer means such as a bus. Locations in the cache correspond to certain of the locations in memory. Each location in the cache which corresponds to a location in memory contains a copy of the value presently stored at that location in memory. Both the memory and the cache are responsive to a memory write signal, an address, and data on the data transfer means. The memory writes the data on the data transfer means to the memory location specified by the address and the cache writes the data to the cache location corresponding to the memory location when the memory location has a corresponding cache location. By this means, the cache is automatically updated whenever data is written to the memory.

Further features of the invention include a simplified structure which makes use of "dirty" or "valid" bits unnecessary, automatic update of the cache on writes to memory from I/O as well as from the CPU, and logic permitting the CPU to read the cache while the I/O is performing a memory write operation.

It is thus an object of the invention to provide an improved memory system;

It is a further object of the invention to provide a cache which is automatically updated whenever data is written to memory;

It is another object of the invention to provide a cache which is simpler than prior-art caches;

It is an additional object of the invention to provide a cache which is automatically updated on writes from I/O to memory as well as on writes from the CPU to memory;

It is still another object of the invention to provide a cache wherein the CPU may perform read operations while the memory is receiving data from I/O.

Other objects and advantages of the present invention will be understood by those of ordinary skill in the art after referring to the detailed description of a preferred embodiment and the drawings, wherein:

BRIEF DESCRIPTION OF THE DRAWINGS

FIGS. 3 and 3A are a detailed block diagram of a preferred embodiment of the data cache of the present invention;

Figure 1:
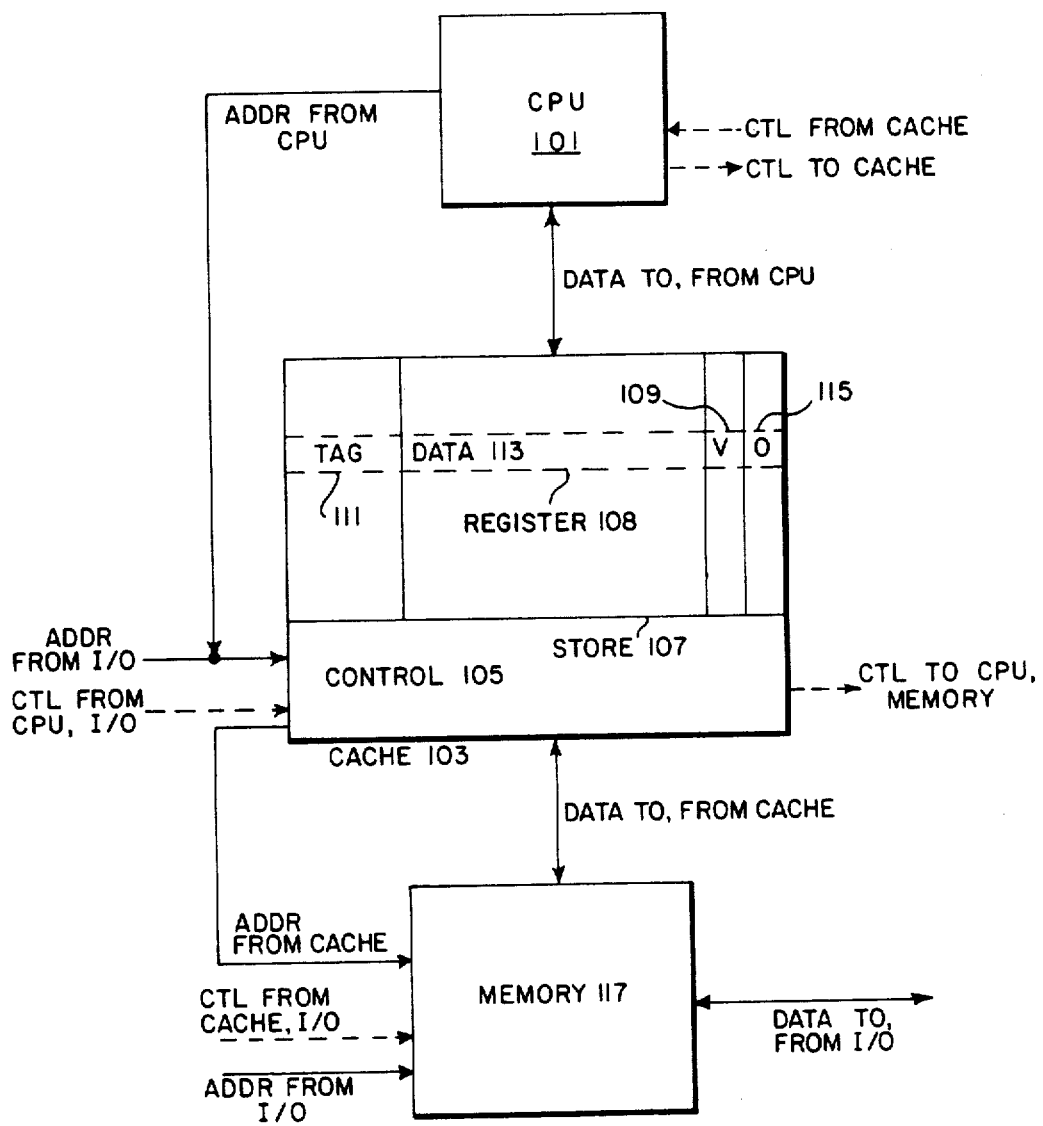
FIG. 1 is a block diagram of a digital computer system including a prior-art data cache.

Reference numbers employed in the drawings have three digits. The most significant digit is the number of the drawing in which the item referred to by the reference number first appears; thus, reference number 215 refers to an item shown in FIG. 2.

DESCRIPTION OF A PREFERRED EMBODIMENT

Figure 2:
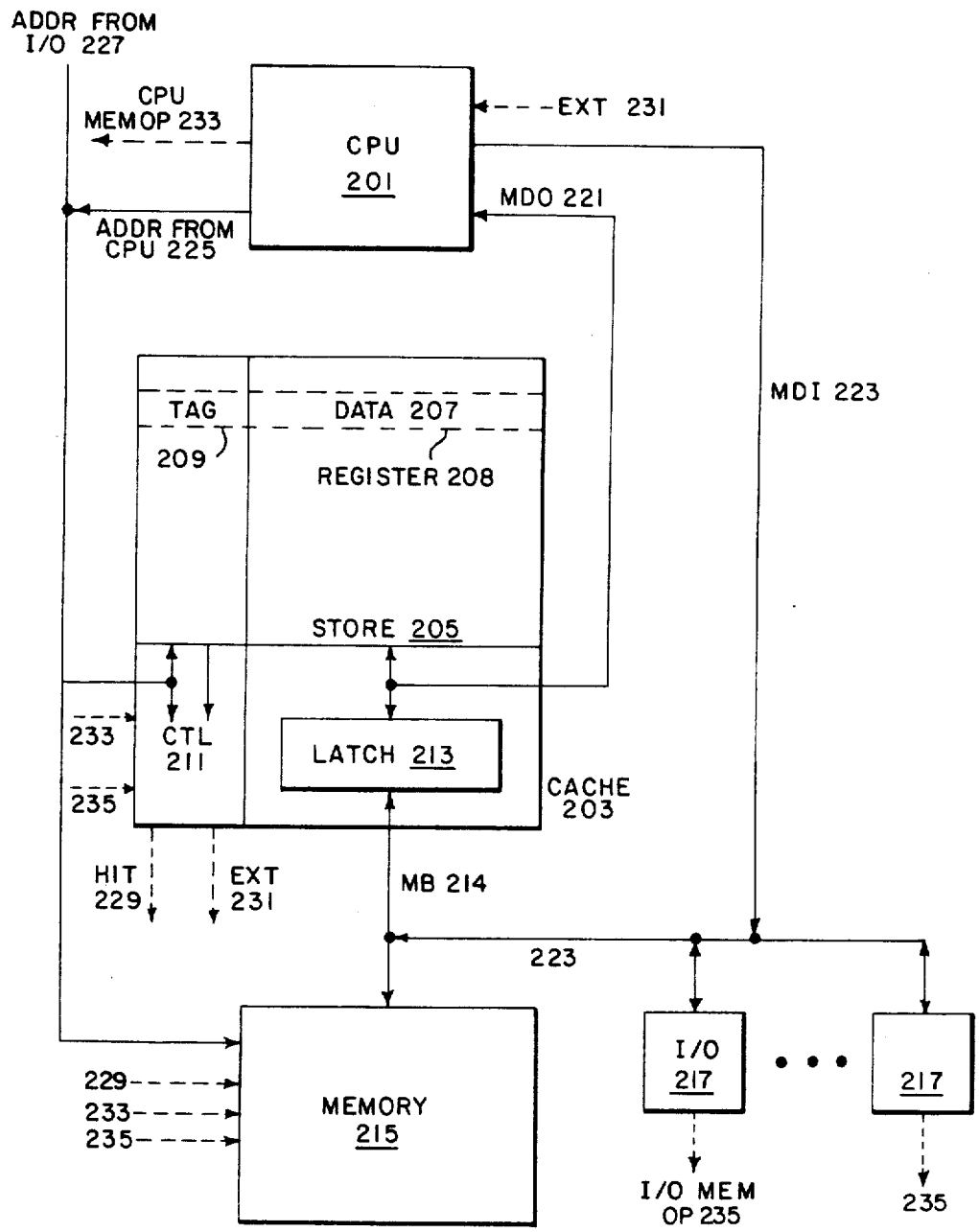
FIG. 2 is a block diagram of a digital computer system including the data cache of the present invention.

1. Overview of the Present Invention: FIG. 2

FIG. 2 is a block diagram of a digital computer system including the cache of the present invention. FIG. 2 has three main components: CPU 201, cache 203, and memory 215. CPU 201, cache 203, and memory 215 are all connected to ADDR bus 225, which also receives addresses 227 from I/O. CPU 201 further provides CPU mem op signals 233 specifying memory operations to cache 203 and memory 233. Data transfer to and from CPU 201 is achieved by MDO bus 221 and MDI bus 223. CPU 201 receives data via MDO bus 221 and outputs data via MDI 223; MDI 223 further receives data from and provides data to I/O devices 217 and is connected to MB bus 214, which is the data input and output for memory 215. I/O devices 217 additionally provide I/O mem op signals 235 to memory 215 and cache 203. Bus contention control logic which is not germane to the present invention ensures that only one of CPU 201, memory 215, and the I/O devices 217 places data on MDI 223 at a given time.

Cache 203 includes store 205, control 211, and latch 213. Store 205 contains registers 208, each one of which includes tag 209 and data 207. Tag 209 is a portion of the address of the location in memory 215 of the data of which data 207 is a copy. Tag 209 therefore determines which address in memory 215 is represented by a given register 208. At a given time, each register 208 corresponds to a single address in memory 215, but a given register 208 may correspond to different addresses in memory 215 at different times. Data 207 is input to and output from store 205 via MDO bus 221; input is from MB 214 via latch 213 and output is to CPU 201. Tags 209 are input from Addr 225.

Control 211 receives addresses from ADDR 225, tags from tag 209, and mem op signals 233 and 235 from CPU 201 and I/O 217; it controls operation of store 205 and outputs hit signal 229 to memory 215 and ext signal 231 to CPU 201. Controlling operation of store 205 involves causing store 205 to output a copy when a memory read operation is being performed by CPU 201 and store 205 contains a copy of the data at the memory location specified by the address and causing store 205 to store a copy of the data when data is written by CPU 201 or I/O 217 to a location for which store 205 contains a copy or when CPU 201 performs a read operation and there is no copy of the addressed data in store 205. In the latter case, control 211 also loads tag 209 with the tag portion of the address of the data being read. Hit signal 229 and ext signal 231 coordinate operation of memory 215 and CPU 201 on a memory read operation. Hit signal 229 inhibits operation of memory 215; signal 229 is active when a copy of the addressed data is contained in store 205; ext signal 231 causes CPU 201 to wait until data can be obtained from memory 215 when there is no copy of the addressed data in store 205.

Latch 213 is connected to MDO 221 and MB 214. Latch 213 retains a copy of each data item carried on MB bus 214, i.e., of each data item read into or output from memory 215. When a memory read operation is performed by CPU 201 and a copy of the data being read is not present in store 205, memory 215 outputs the addressed data to MB 214, from whence it is latched into latch 213. From there, it goes simultaneously to store 205 and CPU 201. Control 211 does not respond to memory read operations performed by I/O 217. Consequently, the data latched into latch 213 is written to store 205 only in response to a read operation from CPU 201. When a memory write operation is performed by either CPU 201 or I/O 217, memory 215 receives the data to be written via MB 214 and a copy is latched into latch 213. If there is a register 208 corresponding to the memory location being addressed in the write operation, the data latched into latch 213 is loaded into data 207 of that register.

Cache 203 operates as follows: on a read operation from CPU 201, CPU mem op 233 indicates the read operation and ADDR 225 carries the address of the data being read. Control 211 receives the address and CPU mem op 233 and compares the address with the tag belonging to register 208 which may contain the copy of the data at the memory location specified by the address. If there is a match, control 211 outputs a hit signal 229 which inhibits memory 215 from responding to the address and data 207 in register 208 containing the matching tag is output from store 205 to CPU 221 via MDO 221.

If there is no match, control 211 does not output a hit signal 211 to memory 215, but instead outputs an ext signal 231 to CPU 201. CPU 201 responds to ext 231 by waiting to receive data from MDO 221 until it can be provided by memory 215 instead of store 205. Since memory 215 has not been inhibited by hit signal 229, it responds to the address on ADDR 225 by outputting the addressed data to MB 214. Latch 213 latches the data which appears on MB 214, and it goes from latch 213 via MDO 221 to CPU 201. Simultaneously, control 211 locates the register 208 of store 205 which should contain a copy of the addressed data and loads tag 209 of that register 208 with a portion of the address on Addr 225 and data 207 with the data stored in latch 213. Thus, at the end of the read operation, CPU 201 has received the data and a copy of the data has been stored in cache 203, where it is available for the next read operation to the same location in memory 215.

On a write operation, the data may come from either CPU 201 or one of I/O 217. In both cases, the address appears on ADDR 225 and the data appears on MB 214, from whence it is latched into latch 213 and written to memory 215. As with the read operation, control 211 compares the address with tag 209 of any register 208 which may contain a copy of the data at the location being written to. If there is such a register 208, control 211 loads data 207 in that register from the contents of latch 213, thereby ensuring that data 207 remains a copy of the data at the corresponding location in memory 215. If the comparison of the address with tag 209 shows that none of the registers 208 corresponds to the location being written to, control 211 does not load any register 208 from latch 213. If a register 208 may be written to in less than the time required for CPU 201 to read data from store 205, memory write operations may be performed by I/O 217 while CPU 201 is performing memory read operations which result in cache hits.

As may be seen from a comparison of FIGS. 1 and 2 and the foregoing descriptions, cache 203 of the present invention is substantially simpler in structure and operation than prior-art caches. Cache 203, CPU 201, and memory 215 share ADDR 225, cache 203 and memory 215 share MB 214, which receives data from MDI 223, shared by CPU 201 and I/O 217, and provides it to MDO 221, shared by cache 203 and CPU 201. Since data written to memory 215 is written to cache 203 whenever there is a register 208 corresponding to the memory address being written to, there is no need to store information corresponding to D 115 or V 109 in store 205, and the tasks performed by control 211 are correspondingly simpler. Further, latch 213 assures that when cache 203 does not contain data being read by CPU 201, the data read from memory 215 to CPU 201 is also available to cache 203 and can be stored in store 205 while it is being provided to CPU 201.

Figure 3:
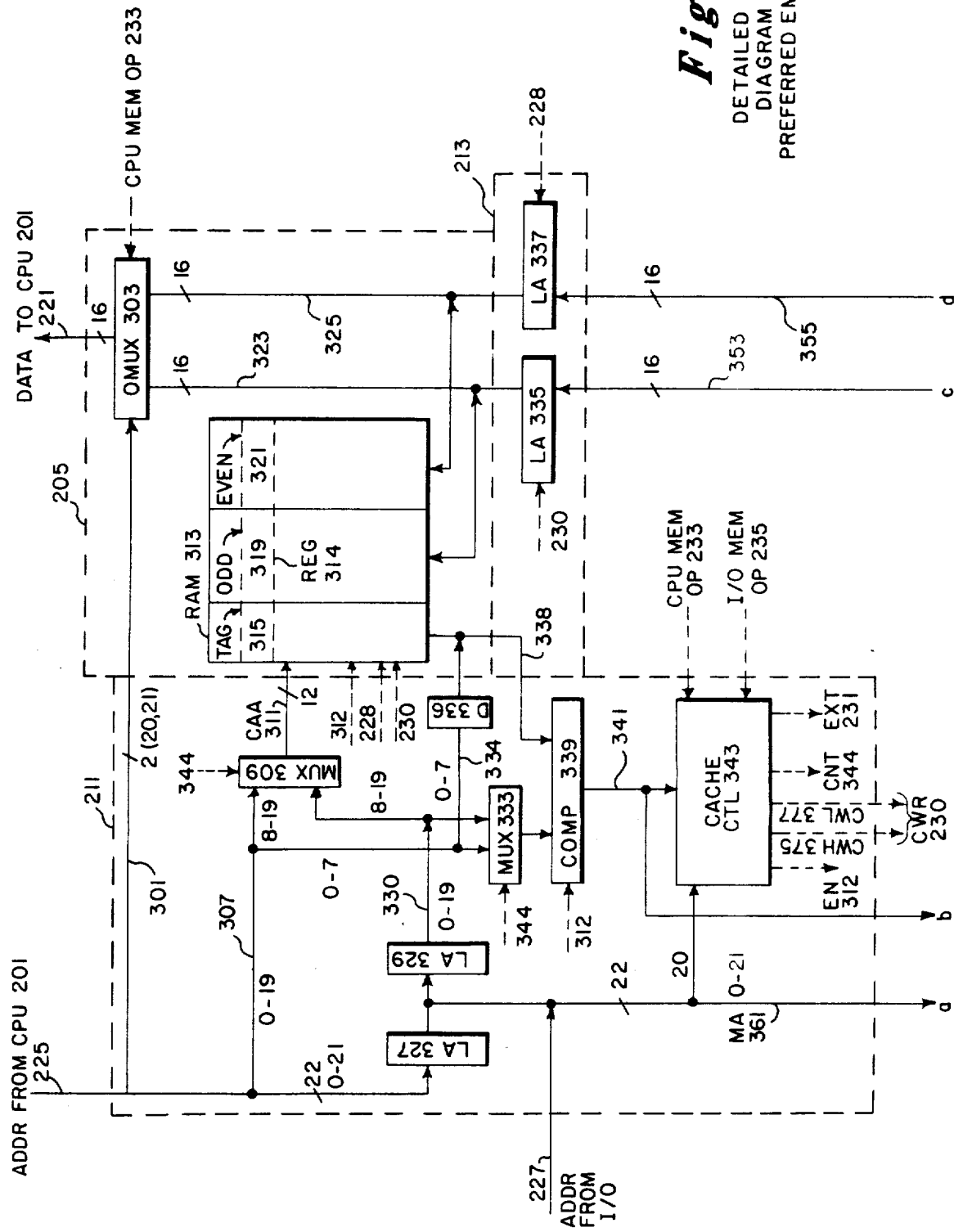

2. Detailed Description of a Preferred Embodiment: FIGS. 3 and 3A

FIGS. 3 and 3A are detailed block diagrams of a preferred embodiment of cache 211 and memory 215 of the present invention. Buses which continue from FIG. 3 to FIG. 3A are labelled with corresponding letters in both figures. Further, dotted outlines in FIG. 3 and numbers from FIG. 2 indicate the relationship between the components of FIG. 2 and the components of FIG. 3.

The preferred embodiment is implemented in a VS digital computer system produced by Wang Laboratories, Inc. Digital computer systems of the VS type employ 24-bit addresses to address 8-bit bytes in memory. In the VS system of the present embodiment, data is stored in memory and in the cache in 32-bit words, while the data buses connecting the CPU and the I/O devices to the cache and memory are 16 bits wide. Data may be received from and provided to the CPU and I/O devices as either single bytes or as 16-bit half words. The left halfword in a memory word is termed the odd half word and the right halfword is termed the even halfword.

a. Store 205

Beginning with store 205, in a present embodiment, store 205 is embodied in cache RAMs 313, which contain 4096 40-bit registers 314, each containing three fields: an 8-bit tag field 315, which contains the most significant 8 bits of the address of the word in memory 215 which has been copied into register 314, a 16-bit odd field 319, which contains the odd half word of the copied memory word, and a 16-bit even field 321, which contains the even half word of the copied memory word. Cache RAMs 313 are addressed by means of a 12-bit address carried on CAA 311; in response to the address on CAA 311 and an en signal 312 generated by cache ctl 343 when a memory operation may involve cache 203, cache RAMS 313 output the contents of tag field 315 in the addressed register 314 to bus 338, the contents of odd field 319 to bus 323, and the contents of even field 321 to bus 325.

When the address on CAA 311 and en signal 312 is accompanied by cache write high (cwh) signal 375 or cache write low (cwl) signal 377, also generated by cache ctl 343, cache RAMs 313 store the value on bus 323 in odd field 319 or the value on bus 325 in even field 321, depending on whether a cwh 375 or a cwl 377 is being responded to. Cwh 375 and cwl 377 thus together fill the function of cwr 230 in a preferred embodiment. Cache RAMs 313 may be constructed of 10 4K × 4 NMOS RAM integrated circuits of type 8168-45. These integrated circuits have a cycle time of 45 ns.

b. Mem 215

Continuing now with Mem 215, in a present embodiment, mem 215 consists of mem RAMs 365, memory control (mem ctl) 345, address multiplexer (mux) 363, latches (LA) 349 and 351, and byte-swapping bidirectional drivers SW 357 and SW 359. As will be explained in more detail later, latches 349 and 351 and drivers 357 and 359 permit writing and reading of individual bytes in a half word. Mem RAMs 365 consist of 1024K registers, each of which contains a 32-bit data word made up of an odd 16-bit half word and an even 16-bit half word and 12 bits of error correction code. The error correction code is not germane to the present invention and will not be discussed further.

The data words are arranged in 4 pairs of 256K banks. One bank of each pair contains even half-words and the other contains odd half-words. The even half-word banks receive input from and output to bus 355; the odd half-word banks receive input from and output to bus 353. Addressing is by means of BS signal 373, which selects one pair of banks, RAS signal 346, which indicates that the address being received is a row address, and CAS signal 347, which indicates tha address being received is a column address, and A lines 366, which provide a 9-bit row address followed by a 9-bit column address. If a bank is enabled and it receives a RAS 346 signal and a row address, followed by a CAS 347 signal and a column address, it outputs the 16 bits of data contained in the addressed half word to bus 355 if it is the even half word and to bus 353 if it is the odd half word. If a bank is enabled, receives row and column addresses as described above, and further receives we signal 372, the data on either of busses 353 and 355 is written to the addressed half word, depending on whether the addressed half word is odd or even. In a present embodiment, each bank consists of 22 256K × 1 NMOS RAMs of type 50256-15, manufactured by Hitachi. RAMs of this type have a 150 ns cycle time.

Control signals and addresses for mem RAMs 365 are provided by mem ctl 345 and mux 363 in response to memory control signals and addresses from either CPU 201 or I/O 217. Mem ctl 345 generates RAS 346 and CAS 347 unless inhibited by a hit signal 229 on bus 341, generates BS 373 in response to bits 0 and 1 of the address received on MA 361 and WE 372 in response to I/O mem op 235 or CPU mem op 233 when either of these specifies a write operation. Mux 363 receives bits 2-19 of MA 361 and provides a 9-bit row address to A 366 consisting of bits 2-9 and 18 of MA 361 and a 9-bit column address to A 366 consisting of bits 10-18 and bit 19 of MA 362. Selection of the column address is controlled by CAS 347. Mux 363 may be implemented by means of three 4-bit multiplexers of type 74F257.

Mem RAMs 365 receive and output only 32-bit words; however, as previously mentioned, the VS computer system addresses individual bytes and MDI bus 223 in a present embodiment is 16 bits wide. LAs 349 and 351 and SW drivers 357 and 359 permit memory 215 to receive and output single bytes as well as half words. LA 349 is connected to bus 353, which carries the odd half word when mem RAMs 365 input or output data, and LA 351 is connected to bus 355, which carries the even half word. Each latch stores two bytes, and each byte may be written or read separately. SW 359 drives bus 353 in either direction, and SW 357 does the same for bus 355. Each driver is made up of four byte drivers in a configuration which permits the two bytes of the half word carried on the bus to be either driven unchanged onto the buses connected to the driver or permits the two bytes to be swapped, so that the low byte become the high byte and vice-versa. LAs 349 and 351 and SW drivers 357 and 359 are controlled by swctl signals 371, generated by mem ctl 345 in response to bits 19-21 of MA 361.

The components cooperate as follows: in a read operation, mem RAMs 365 output either the odd half word or the even half word as specified by MA 0-18 to bus 353 or bus 355. The half word is latched into LA 349 or LA 351, depending on whether it is odd or even. If bits 19-21 of the address specify the first byte of the odd half word, SW driver 359 responds to swctl 371 by outputting the contents of LA 349 to bus 223 without swapping the bytes; if bits 19-21 specify the second byte of the first half word, SW driver 359 responds to swctl 371 by swapping the bytes as it outputs the odd half word to bus 223. If bits 19-21 of the address specify either the first or second bytes of the even half word, SW driver 359 does the same with the contents of LA 351.

In a write operation, the 16 bits containing the byte or bytes to be written are on MDI bus 223. If what is to be written is a half word, the operation takes place as follows: under control of swctl 371, either SW 359 or SW 357, depending on whether the half word is even or odd, drives the value on MDI bus 223 onto bus 353 or 355, from whence the half word is received by Mem RAMS 365. If what is to be written is a byte, the write operation is done as a read modify write operation. In this operation, mem RAMs 365 outputs the half word, specified by bits 0-18 of the address on MA 361, which contains the byte specified by the entire address. Depending on whether the half word is odd or even, it is output to either bus 353 or bus 355 and is latched under control of swctl 371 into either LA 349 or LA 351. Then, as specified by swctl signals 371 in response to bits 19-21 of the address, SW 359 or SW 357 drives the byte to be written onto either bus 355 or 353 and LA 349 or LA 351 which contains the half word to which the byte being written belongs latches the value on the bus into the byte of LA 352 or LA 359 which is being written. At this point, either LA 349 or LA 351 contains the half word as it should appear after the write operation. Thereupon, either LA 349 or LA 351 outputs its contents to bus 353 or bus 355, and the addressed half word is written to mem RAMs 365. LA 349 or 351 may be constructed of 28-bit D latches of type 74LALS373 and SW 357 or SW 359 may be constructed of 4 8-bit bidirectional 8-bit drivers of type 74LS245.

c. Buses MB 214, MDO 221, MDI 223, and Latch 213

In the preferred embodiment, MB bus 214, which runs between memory 215 and latch 213, is implemented as two 16-bit buses, bus 353 which connects the odd banks of mem RAMs 365, LA 335, LA 349, and SW 359, and bus 355, which connects the even banks with LA 337, LA 351, and SW 357. As explained in connection with memory 215, all data input to or output from mem RAMs 365 is carried on buses 353 and 355. Buses 353 and 355 are connected via LA 335 and LA 337 with MDO bus 221 and via swapping drivers SW 359 and 357 with MDI bus 223. As previously pointed out, MDI bus 223 in a present embodiment carries 16 bits of data.

MDO bus 221 in a preferred embodiment is implemented within cache 203 as two 16-bit buses. Bus 323 connects the registers of cache RAMs 313 which contain the odd half words to LA 335 and output mux (omux) 303; bus 325 connects the registers of cache RAMs 313 which contain the even half words to LA 337 and omux 303. Omux 303 is connected to the portion of MDO bus 221 which carries data from cache 203 to CPU 201; in the preferred embodiment, that bus is 16 bits wide. Omux 303, under control of the two least significant bits of the address received from CPU 201, on bus 301, and of a signal in CPU mem op signals 233 which indicates a single-byte read operation, outputs either the odd half-word, the even half-word, or, if a single byte is specified, a half-word in which the specified byte is the first byte of the half word and the remainder is filled with 0's Omux 303 may be implemented by means of 8 8 to 2 multiplexers of type 74S253 and an 8-bit driver of type 74S244 to supply the 0 fill.

Latch 213 is implemented as two 16-bit latches, LA 335, which receives data from bus 353 and provides it to bus 323, and LA 337, which receives data from bus 355 and provides it to bus 325. Each latch always contains a copy of the last values to appear on buses 353 and 355 respectively. LA 335 outputs to bus 323 in response to a cwh signal 375 and LA 337 output to bus 325 in response to a cwl signal 377. The signals are provided by cache ctl 343. Each of the latches may be implemented using two 8-bit D latches of type 74ALS373.

d. Control 211

Control 211 receives addresses and memory operation signals from CPU 201 and I/O 217. CPU addresses in the VS system which includes the preferred embodiment are 24-bit logical addresses, while the I/O addresses are 22-bit physical addresses; however, by the time the addresses from CPU 201 reach control 211 in the preferred embodiment, they have been transformed into 22-bit physical addresses. Beginning with the components of control 211 having to do with addressing, CPU addresses are input via bus 225; the two least-significant bits of the CPU address go via bus 301 to omux 303, where they select the half word to be output to MDO bus 221; the remaining bits are carried on bus 307; of these bits, the most significant 8 bits, bits 0-7, are carried on bus 334, which provides bits 0-7 to mux 333, the source of bits for the tag compare operation, and to driver D336, which provides them to the tag portion of cache RAMs 313. The remaining 12 bits from bus 307 go to mux 309, the source of addresses for cache RAMs 313. In addition, all of the bits on bus 225 go to LA 327, from which they are output via MA 361 to memory 215 and via LA 329 and bus 330 to mux 309 and mux 333. In addition to receiving address bits from LA 327, MA bus 361 and LA 329 receive them from I/O 217 via bus 227. The destinations of the bits from bus 227 are the same as those of the bits from LA 327. As may be seen from the preceding description, the address bits for CAA 311 and the bits to be compared with tag 315 from the addressed register 314 come alternatively from bus 307 and latch 329. As will be explained in more detail later, they come from bus 307 in the case of a memory read operation with a cache hit and in all other cases from LA 329.

Continuing with the portions of control 211 which control operation of the present invention, comp 339 receives and compares inputs from tag portion 315 of cache register 314 currently being addressed by the bits on CAA bus 311 with bits 0-7 of the address to which memory 215 is currently responding. If the two are equal, comp 339 generates hit signal 229 on line 341. Line 341 is connected to mem ctl 345 and to cache ctl 343 and provides hit and miss signals to those components. Cache ctl 343 further receives as inputs CPU mem op 233, I/O mem op 235, and a line carrying bit 20 of the address on MA 361, and it produces as outputs cwh signal 375 or cwl signal 377, indicating that an odd half word or an even half word is to be written to cache RAMs 313, and ext signal 231. The latter is produced in response to a CPU read operation which does not produce a hit signal 229 and indicates that CPU 201 is to extend its cycle for the period necessary for mem RAMs 365 to output the data. As already explained, mem ctl 345 receives mem op signals 235 and 233 and bits 0,1 and 19-21 from MA 361 together with hit signal 229 and produces as outputs swctl 371, CAS 347, RAS 346, BS 373, and WE 372. In response to a hit signal, mem ctl 345 suppresses RAS 346, thereby inhibiting operation of mem RAMs 367.

Regarding the components of control 211, muxes 309 and 333 may be implemented using two 8 to 4 muxes of type 74F157. Driver D 336 may be implemented using an 8-bit driver of type 74LS244. Latches LA 327 and LA 329 may be each implemented using three 8-bit D latches of type 74F373. Comp 339, finally, may be implemented with an 8-bit- comparator of type 74F521. Cache ctl 343 and mem ctl 345 are made up of discrete logic. Construction of logic to perform the functions described herein for cache ctl 343 and mem ctl 345 is well-known in the art.

3. Operation of a Preferred Embodiment

The following discussion of the operation of the preferred embodiment of FIG. 3 will deal first with memory read operations and then with memory write operations. In each case, operations performed for CPU 201 and I/O 217 and with and without cache hits will be discussed.

a. CPU memory read operation with cache hit

When CPU 201 performs a memory read operation, ADDR bus 225 carries the address and CPU mem op 233 specifies the read operation. All 22 bits of address on ADDR 225 are latched into LA 327. At the same time, the two least significant bits go to omux 303 and bus 307 carries the next 12 bits to mux 309, and the 8 most significant bits to mux 333. In response to CPU mem op 233 specifying the read operation, cache ctl 343 outputs EN signal 312, which enables comp 339 and cache RAMs 313, and CNT signal 344, which causes mux 309 and mux 333 to select the inputs they receive from bus 307.

In consequence, CAA 311 provides the 12 bits input from bus 307 to mux 309 as an address to cache RAMs 313. In response to that address cache RAMs 313 output tag 315 from the addressed register to bus 338, odd half-word 319 from that register to bus 323, and even half-word 321 to bus 325. As previously explained, omux 303 responds to the two least-significant address bits by selecting the addressed byte or half word from the word output to omux 303 and outputting the byte or half word to MDO bus 221. Comp 339 receives tag 315 and compares it with the 8 bits of the address which mux 333 provides from bus 307. As previously explained, tag 315 is equal to the 8 bits of address if the data in register 314 is a copy of the data at the address on bus 225. When tag 315 and the address bits are equal, comparator 339 generates hit signal 229 on hit line 341.

In response to hit signal 229, mem ctl 345 inhibits generation of RAS 346 and thereby inhibits operation of mem RAMs 365. Since CPU 201 has not received ext signal 231 from cache ctl 343, CPU 201 takes the data output from omux 303.

b. CPU memory read operation with cache miss

When register 314 does not contain a copy of the data at the addressed location in memory, tag 315 is not equal to the 8 most significant bits of the address and hit line 341 does not carry hit signal 229. Cache ctl 343 responds thereto by first generating ext signal 231 and then, at the proper time for writing data to RAMs 313, cwh 375 or cwl 377, depending on the value of bit 20 of MA 361. In response to ext signal 231, CPU 201 extends its cycle and does not take the data output from cache RAMs 313. The address on bus 225 has been latched into LA 327, and on the miss, it is output to MA bus 361 and is latched into LA 329. Mem ctl 345 responds to the miss signal by permitting generation of RAS 346 and CAS 347 from the value on MA bus 361, so that mem RAMs 365 respond to BS 373 and the address bits from mux 363 by outputting the addressed half word to bus 353 or bus 355. As previously explained, LA 335 or LA 337 latches the word as it appears on one or the other of the buses. Cache ctl 343 ceases generating CNT 344 on the miss, and consequently, mux 309 selects bits 8-19 from bus 330 as the input for CAA 311. Meanwhile, bus 307 is still providing bits 0-7 of the address to bus 334. Depending on whether cache CTL 343 is generating cwh 375 or cwl 377, either LA 335 or LA 337 outputs the latched half word to either bus 323 or bus 325. The buses carry the half word to omux 303, where the addressed byte or half word is output to CPU 215 as described above, and also to cache RAMs 313. Cache RAMs 313 thus store bits 0-7 of the address on bus 334 in tag field 315 and, depending on whether cwh 375 or cwl 377 is being generated, the odd half word on bus 323 in odd field 319 or the even half word on bus 325 into even field 321 of register 314 addressed by the bits on CAA 311. Since the bits written into tag field 315 are the tag for the memory address containing the half word written into field 319 or 321, the result is that register 314 now contains a valid copy of the data at the memory address which caused the cache miss.

c. I/O read operations

When a read operation is initiated by an I/O device 217, the address appears on bus 227 and consequently on MA bus 361. Cache ctl 343 and mem ctl 345 receive I/O mem op signals 235, but when these signals specify a read operation, cache ctl 343 does not respond. Consequently, EN signal 312 is not generated, RAM 313 does not output data to buses 323, 325, or 338, and comp 339 does not generate a hit signal 229. Mem ctl 345 does respond to I/O mem op signals 235 and is not inhibited by a hit signal from comp 339. It therefore generates RAS 346 and CAS 347, so that mem RAMs 365 output the data at the address on MA 361 to buses 353 and 355. LA 335 and LA 337 latch the data, but since cache ctl 343 does not generate a cwh signal 375 or a cwl signal 377, the data is neither written to cache RAMs 313 nor output to CPU 201 via MDO bus 221. Instead, it is output to LA 349 and SW 359 and to LA 351 and SW 357, which, as previously described, output the byte or half word being addressed in response to swctl signals 371 which mem ctl 345 generates in response to bits 18-21 of MA 361.

d. Memory write operations with cache hit

Memory write operations proceed the same way, regardless of whether the data is being written from CPU 201 or an I/O device 217. The data to be written appears on MDI bus 223. If the data is being written from CPU 201, the address appears on bus 225 and is latched into latch 327 and from there to latch 329, from whence it is distributed to mux 309 and mux 333. If the data is being written from I/O 217, it appears on bus 227 and is latched into latch 329. Cache ctl 343 responds to CPU mem op signals 233 or I/O mem op signals 235 specifying a write operation by generating es signal 312 enabling cache RAMs 313. CNT 344 is not being generated, and consequently, mux 333 and mux 309 to select their inputs from bus 330. Cache RAMs 313 respond to the cache address on CAA 311 and EN signal 312 by outputting tag 315 from the register 314 addressed by the bits on CAA 12 to comp 339 and the data in fields 319 and 321 to buses 323 and 325. However, since what is being performed is a write operation, the data is ignored. If tag 315 and the address bits selected to be input to comp 339 are equal, the data being received on bus 223 must be written to both cache RAMs 313 and mem RAMs 365.

The write operation to mem RAMs 365 is performed as described in the discussion of operation of memory 215 in the preferred embodiment. If what is being written is a half word, SW 359 or SW 357 inputs it to bus 353 or bus 355, from which it goes to the proper RAMs in mem RAMs 365 or the proper latch of LA 335 or 337. If what is being written is a byte, a read modify write operation is necessary. As previously described, the half word containing the byte is output to either LA 349 or LA 351, depending on whether the half word is odd or even, and the byte to be written is received on MDI 223 and modified in the latch. The modified contents of the latch are then written to mem RAMs 365 and LA 335 or LA 337. Depending on the value of bit 20 of MA 361, cache ctl 343 generates either cwh 375 or cwl 377, to which either LA 335 or LA 337 responds by outputting its contents to bus 323 or 325, and to which cache RAMs 313 respond by writing the values on buses 334, 323, and 325 to register 314, thereby updating that register 314. Mem ctl 345 generates we 372, to which mem RAMs 365 respond by writing the values on buses 353 and 355 to the location specified by the address on MA 361. Thus, at the end of the operation, register 314 corresponding to the memory location being written to and the memory location both contain the same data.

d. Memory write with a cache miss

When there is a cache miss on the memory write operation, cache ctl 343 does not produce either cwh 375 or cwl 377, and consequently, data is written to mem RAMs 365 but not to cache RAMs 313.

e. CPU reads from cache during I/O memory write operations

As indicated in the discussions of cache RAMs 313 and mem RAMs 365, in a preferred embodiment, the RAMs making up cache RAMs 313 have a cycle time of 45 ns, while those making up mem RAMs 365 have a cycle time of 150 ns. Consequently, cache 203 in a preferred embodiment operates at three times the speed of memory 215. The preferred embodiment takes advantage of this fact and of the fact that whenever data is written to an address in memory 215 which has a corresponding register in cache 203, it is also written to the register in cache 203 by permitting CPU 201 to continue to perform read operations while memory 215 is receiving data from I/O 217.

In order to permit CPU read operations during I/O write operations, a preferred embodiment provides two paths by which the least significant 12 bits of the address may be provided to cache RAMs 313 and the most significant 8 bits to COMP 339. The first path, used only for CPU read operations, consists of bus 225, bus 307, mux 309, and mux 333; the second path, used for all write operations, including those resulting from a miss on a CPU read operation, consists of bus MA 361, LA 329, bus 330, mux 309, and mux 333. The address on the first path is received directly from bus 225; the address on the second path is received from bus 227 when the write operation is an I/O write operation and from bus 225 via LA 327 when the write operation is a CPU write operation or results from a cache miss on a CPU read operation. During the write operation, the address on the second path is retained in LA 329. Which address is chosen as the input to comp 339 and CAA 311 is determined by CNT signal 344, which is generated by cache ctl 343 in response to a CPU read operation. When CNT 344 is active, mux 309 and mux 333 select address bits from bus 307; otherwise, they select address bits from bus 330. The write operation to cache RAMs 313 using the address on bus 330 is timed to be completed before the next CPU read operation using the address on bus 307 takes place. If a miss occurs on a CPU read operation during an I/O write operation, ext 221 remains active until both the I/O write operation and the loading of RAMs 313 with the data at the address which caused the miss in the CPU read operation have been completed.

In a preferred embodiment, CPU 201 has an unextended cycle time of 200 ns and memory 215 has a cycle time of 400 ns. RAMs 313 may be loaded and then read in a period of less than 150 ns. Thus, on a CPU read with a hit, valid data is available to CPU 201 on bus 221 in the last 50 ns of the CPU cycle. On a CPU read with a miss, the address which caused the miss is latched from LA 327 to MA bus 361 and LA 329 near the end of the CPU cycle which caused the miss. RAS signal 346, which commences the memory operation, is generated in the case of a miss at the end of the CPU cycle and the CAS signal is generated 50 ns later. The data read from mem RAMs 365 appears in 100 ns more on bus 353 or 355, and is latched into LA 335 or LA 337 50 ns later. From there, the data goes to RAMs 313, which perform the write operation in response to the address in LA 329, and to omux 303. The data is available to CPU 201 600 ns after the beginning of the CPU read operation which caused the cache miss.

On an I/O write operation with a hit, the address from bus 227 is latched into LA 329 and made available to RAMs 313 after the first 100 ns of the memory cycle. The comparison is performed and the hit signal generated 100 ns later. The data from bus 353 or 355 is written to mem RAMs 365 and LA 335 or LA 339 150 NS later, and to cache RAMs 313 by the end of 400 ns. The address used in the write to cache RAMs 313 comes from LA 329. While the I/O write operation with the hit is going on, CPU read operations with hits may be performed using the address received via buses 225 and 307. The CPU read operations are offset 100 ns from the write operations. As previously stated, the CPU read operation with a hit takes 200 ns. Thus, the CPU read operation begun before the I/O write operation commenced will receive its data 100 ns into the I/O write operation and the next CPU read operation will receive its data 300 ns into the I/O write operation. Since the following CPU read operation will receive its data 500 ns into the I/O write operation and the data received in the I/O write operation has been stored by the end of 400 ns, the data will be available for the following CPU read operation.

4. Conclusion

The foregoing Description of the Preferred Embodiment has disclosed how one skilled in the art may construct and use a memory system including a simplified cache which is automatically updated on every write to memory. The discussion has disclosed the arrangement of components in a preferred embodiment and their operation in response to a CPU read operation, a CPU write operation, an I/O read operation, and an I/O write operation. However, the invention may be embodied in specific forms other than the one disclosed herein without departing from the spirit or essential characteristics thereof. For example, other embodiments may employ memories and caches which do not store data as bytes or half words, and in such systems, cwh 363 and cwl 365 may be replaced by a single signal and signals such as swctl 371 will not be required. Other embodiments may also use the same size of bus between the cache and memory as between memory and I/O or memory and CPU. In such embodiments, the portions of the preferred embodiment relating to half word and byte selection would not be required. The invention is further in no way dependent on such variables as memory or cache size, address size, or bus size. Finally, the cache may output data not only to CPUs, but to any device which may function as a data sink. Thus the preferred embodiment described herein is to be considered in all respects as illustrative and not restrictive, the scope of the invention being indicated by the appended claims rather than by the foregoing description, and all changes which come within the meaning and range of equivalency of the claims are intended to be embraced therein.

What is claimed is:

1. Addressable data storage apparatus for storing and outputting data in response to addresses comprising:
   (1) address providing means;
   (2) data bus means;
   (3) memory means connected to the address providing means and the data bus means for responding to an address on the address providing means by outputting the data at a memory location specified by the address on the data bus means unless inhibited;
   (4) latch means connected to the data bus means for storing data provided from the data bus means; and
   (5) encachement means connected to the address providing means and the memory means and having a data input connected to the latch means and a data output for storing copies of certain of the data stored in the memory means at cache locations corresponding to the memory locations containing the certain data and responding to the address when the addressed memory location has a corresponding cache location by outputting the copy to the data output and inhibiting the memory means and responding to the address when the addressed memory location has no corresponding cache location by creating a corresponding cache location, receiving the data stored in the latch in the data input means, and storing the received data in the created corresponding cache location.

2. In the data storage apparatus of claim 1 and wherein:

the data output is further connected to the latch means; and the data output from the memory means when the memory means is not inhibited is output from the latch means to the data output.

3. In the data storage apparatus of claim 1 and wherein:
the data storage apparatus further includes write signal providing
means connected to the memory means and the encachement means;
the data bus further provides data to the memory means;
the memory means responds to a write signal on the write signal providing means and the address by storing the data provided on the data bus in the memory means at the memory location specified by the address; and
the encachement means responds to the write signal and the address when the encachement means contains a cache location corresponding to the addressed memory location by receiving the data stored in the latch in the data input means and storing the received data in the corresponding cache location.

4. In the data storage apparatus of claim 1 and wherein:
each address specifies a byte of data;
each memory location contains n adjacent bytes of data and each corresponding cache location contains a copy of the n adjacent bytes of data;
the data output receives the n adjacent bytes containing the copy of the addressed data from the encachement means when the address specifies a memory location having a corresponding cache location and the n adjacent bytes from the memory means when the specified memory location has no corresponding cache location; and
the data storage apparatus further comprises byte selection means connected to the address providing means and the data output for selecting and outputting one of the received n bytes as specified by the address.

5. In the data storage apparatus of claim 1 and wherein:
each address specifies a half word containing n bits of data;
each memory location contains two half words and each corresponding cache location contains a copy of the two half words;
the data output receives the copy of the two half words of the addressed data from the encachement means when the address specifies a memory location having a corresponding cache location and the two half words of the addressed data from the memory means when the specified memory location has no corresponding cache location; and
the data storage apparatus further comprises half-word selection means connected to the address providing means and the data output for selecting and outputting one of the half words as specified by the address.

6. In the data storage apparatus of claim 5 and wherein:
each address further specifies a byte of data;
each half word contains a plurality of bytes; and
the data storage apparatus further comprises byte selection means connected to the address providing means and the data output for outputting one of the bytes as specified by the address.

7. In encachement apparatus for storing a copy of certain data contained in addressable memory means at a location addressable by means of the address used to address the copied data in the memory means and having input means for receiving the copy,
loading apparatus comprising:
(1) data retention means connected between the input means and the memory means for receiving and retaining all data input to the memory means; and
(2) means for detecting the address of the copied data and responding thereto by loading the retained data via the input means from the data retention means into the location of the copy.

8. In the loading apparatus of claim 7 and wherein:
the memory means outputs data in response to an address;
the data retention means further receives all data output from the memory means; and
the loading apparatus further comprises
means for detecting that the address received by the memory means is not the address of copied data and loading the retained data from the data retention means into the location addressable by means of the address received by the memory means.

9. In a memory system including means and encachement means responsive to addresses and in which the encachment means performs cache read operations and cache write operations substantially faster than the memory means performs memory write operations,
apparatus for performing a cache read operations while the memory means performs a memory write operation comprising:
(1) means connected to the encachement means and the memory means for providing the data to be written to the memory means substantially simultaneously to the memory means and the encachement means;
(2) first address providing means for providing a first address for use in the cache read operation to the encachement means;
(3) second address providing means for receiving a second address used in the memory write operation and providing the second address to the encachement means for use in the cache write operations; and
(4) selection means connected to the first and second address providing means and the encachement means for selecting the first address and providing the first address to the encachement means before the encachement means is required to begin performing the cache write operation using the data on the data providing means and providing the second address to the encachement while performing the cache write operation 10. A memory system for use with a data sink which produces a memory read signal and a first address comprising: data transfer means;
memory means connected to the data transfer means for responding to the memory read signal and the first address by outputting data at the memory location specified by the first address to the data transfer means unless inhibited by a hit signal; and
encachement means connected to the memory means, the data sink and the data transfer means for storing copies of certain of the data stored in the memory means at cache locations corresponding to the memory locations of the certain stored data and responding to the memory read signal and the first address when the first address specifies a memory location which has a corresponding cache location by outputting the copy at the cache location to the data sink and providing the hit signal to the memory means, whereby the data output from the memory system is output from the encachement means when the encachement means contains a copy of the data at the specified location.

11. In the memory system of claim 10 and wherein:

the data sink is inhibited by an extend signal from receiving data from the encachement means; and the encachement means further responds to the memory read signal and the first address when the specified memory location does not have a corresponding cache location by generating the extend signal until the encachement means receives the data from the memory means via the data transfer means and provides the data to the data sink.

12. In the memory system of claim 11 and wherein:

the encachement means further responds to the memory read signal and the first address when the specified memory location does not have a corresponding cache location by establishing a cache location corresponding to the specified memory location and placing the received data in the established cache location.

13. In the memory system of claim 12 and wherein:

the memory system is further used with a data source which produces a memory write signal and a second address;

the data transfer means is connected to the data source and receives data therefrom;

the memory means responds to the memory write signal and the second address by storing the data received from the data source at the memory location specified by the second address; and the encachement means responds to the memory write signal and the second address when the second address specifies a memory location which has a corresponding cache location by storing the data from the data source at the corresponding cache location.

14. In a memory system which includes memory means and encachement means and which is used with a data sink which produces a memory read signal and address, the method of providing data from the memory system to the data sink in response to the memory read signal and the address comprising the steps of:

determining whether the encachement means contains a copy of the data specified by the address;

if the encachement means contains the copy, providing an inhibit signal from the encachement means to the memory means and the copy to the data sink; and if the encachement means does not contain the copy, providing an extend signal from the encachement means to the data sink until the memory means has output the data, receiving the data from the memory means in the encachement means, and providing the data from the encachement means to the data sink.

15. The method of claim 14, and further including the step of establishing a cache location corresponding to the address and storing the received data therein when the encachement means does not contain the copy.

16. In the memory system of claim 13 and wherein:

the encachement means writes the received data and outputs the copy substantially faster than the memory means writes the received data and outputs the data at the specified location;

the memory system further includes selection means for receiving the first and second addressess and providing the first address to the encachement means in response to the memory read signal and the second address to the encachement means in response to the memory write signal.

17. In the memory system of claim 16 and wherein:

the memory system further includes latch means connected to the selection means for retaining the first address and providing the first address to the selection means in place of the second address when the specified memory location does not have a corresponding cache location; and the selection means selects the second address when the data transfer means receives the data read from the memory means, whereby the data read from the memory means is read to the encachement means.

18. In the addressable data storage apparatus of claim 1 and wherein:

the address providing means includes cache read address providing means for providing the address to which the encachement means responds by outputting the copy to the data output when the encachement means has a cache location corresponding to the address; and cache write and memory read address providing means connected to the cache read address providing means for retaining the address when the encachement means has no corresponding cache location and providing the retained address as the address to which the memory means responds and to which the encachement means responds when the encachement means has no cache location corresponding to the address.

19. In the data storage apparatus of claim 3 and wherein:

a first source/sink is connected to the data output and to the data bus means and receives data from the data output and provides data to the data bus means;

a second data source/sink is connected to the data bus means and both receives data from and provides data to the data bus means;

the address providing means includes first address providing means for providing addressess from the first data source/sink and second address providing means for providing addressess from the second data source/sink;

the encachement means includes address receiving means connected to the first and second address providing means for receiving the address to which the encachement means responds by outputting the copy from the first address providing means only and the address to which the encachement means responds by receiving the data stored in the latch from either the first or second address providing means; and the memory means is connected to the first and second address providing means, receives the address provided by either, and responds thereto unless inhibited, whereby the encachement means outputs the copy in response to the address received on the first address providing means while the memory means responds to an address received on the second address providing means.

20. In the data storage apparatus of claim 3 and wherein:
each address specifies a byte of data;
each memory location contains two half words, each containing 2 bytes of data, and each corresponding cache location contains a copy of the two half words;
the bus means includes
means for receiving a byte of data;
a first half word bus including a first half word latch for latching a first half word and first half word driver means connected to the byte receiving means for receiving the byte and setting either the first or second byte of the first half word latch to the received byte and
a second half word bus including a second half word latch for latching a second half word and second half word driver means connected to the byte receiving means for receiving the byte and setting either the first or second byte of the second half word latch to the received byte;
the latch means includes
a first half connected to the first half word bus for storing the half word provided from the first half word bus and
a second half connected to the second half word bus for storing the second half word provided from the second half word bus;
the memory means includes control means responsive to the address and to the write signal for causing the memory means to output the half word specified by the address to the first half word bus or the second half word bus as required by the address and the first or second half word driver to set either the first or second byte of either the first or second half word to the received byte as required by the address and then storing the modified half word at the memory location specified by the address; and
the encachement means includes control means responsive to the address and the write signal for causing the latch means to output the modified half word from the latch means to the encachement means and causing the encachement means to store the modified half word in the cache location corresponding to the memory location specified by the address.

21. In the apparatus for performing a cache read operation of claim 9 and wherein:
the second address is further used in a memory read operation;
the data providing means further provides the data read from the memory means on a memory read operation to the encachement means;
the second address providing means includes latch means connected to the first address providing means for retaining the first address and providing the first address to the second address providing means as the second address when the cache read operation does not succeed; and
the selection means selects the second address providing means when the data providing means provides the data read from the memory means,
whereby the data read from the memory means is written to the encachement means.

22. In a memory system including memory means and encachement means which performs cache read and cache write operations substantially faster than the memory means performs memory write operations and wherein a cache write operation is performed each time a memory write operation is performed on a memory location having a corresponding cache location,
the method of performing a cache read operation during a memory write operation comprising the steps of:
beginning the memory write operation using a first address;
retaining the first address;
performing the cache read operation using a second address;
after completing the cache read operation but before the end of the memory write operation, performing the cache write operation using the retained first address and the data being written to the memory means.

23. In the method of claim 22 and wherein:
the step of performing the cache read operation includes retaining the second address when there is no cache location corresponding to the second address; and
the step of performing the cache write operation is followed by the steps of
performing a memory read operation using the retained second address and
performing a cache write operation using the retained second address and the data being read from the memory means.

* * * * *